(12) United States Patent
Feeser et al.

(10) Patent No.: US 7,775,585 B2
(45) Date of Patent: Aug. 17, 2010

(54) FENDER CONFIGURATION

(75) Inventors: Klaus Feeser, Vaihingen/Enz-Ensingen (DE); Michael Soellner, Grafenau-Döffingen (DE); Michael Wagner, Wiernsheim-Pinache (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/388,526

(22) Filed: Feb. 19, 2009

(65) Prior Publication Data

US 2009/0206633 A1 Aug. 20, 2009

(30) Foreign Application Priority Data

Feb. 20, 2008 (DE) .................... 10 2008 010 138

(51) Int. Cl.
*B60R 21/34* (2006.01)
(52) U.S. Cl. ..................................... 296/198
(58) Field of Classification Search ............... 296/198, 296/187.04; 293/102
See application file for complete search history.

(56) References Cited

U.S. PATENT DOCUMENTS

| 5,226,695 | A | * | 7/1993 | Flint et al. ................. 296/191 |
| 5,429,412 | A | * | 7/1995 | Schoen et al. ................ 296/29 |
| 6,824,199 | B2 | * | 11/2004 | Weik et al. ............. 296/187.04 |
| 7,192,080 | B2 | * | 3/2007 | Marijnissen et al. ........ 296/198 |
| 7,210,732 | B2 | * | 5/2007 | Marijnissen et al. ........ 296/198 |
| 7,413,239 | B2 | * | 8/2008 | Mitsuyama ............ 296/187.04 |
| 7,520,562 | B2 | * | 4/2009 | Dragoi ........................ 296/198 |
| 2003/0155788 | A1 | * | 8/2003 | Cordebar et al. ............. 296/29 |
| 2004/0007901 | A1 | * | 1/2004 | Weik et al. ................... 296/198 |

FOREIGN PATENT DOCUMENTS

| DE | 10009363 A1 | 8/2001 |
| DE | 10102187 A1 | 8/2002 |
| EP | 1129928 B1 | 9/2001 |
| EP | 1138579 A2 | 10/2001 |
| FR | 2894542 A1 | 6/2007 |

OTHER PUBLICATIONS

German Search Report dated Nov. 4, 2008.

* cited by examiner

*Primary Examiner*—H Gutman
(74) *Attorney, Agent, or Firm*—Laurence A Greenberg; Werner H Stemer; Ralph E Locher

(57) ABSTRACT

A fender configuration for a motor vehicle has a fender and a deformation element which is C-shaped in cross section. For the substantially vertically oriented supporting of an upper edge of the fender, an upper limb of the deformation element is connected to the fender and a lower limb is connected to the vehicle body. It is important that the C-shaped deformation element is arranged such that it is open toward the associated fender.

13 Claims, 3 Drawing Sheets

FENDER CONFIGURATION

CROSS-REFERENCE TO RELATED APPLICATION

This application claims the priority, under 35 U.S.C. §119, of German application DE 10 2008 010 138.9, filed Feb. 20, 2008; the prior application is herewith incorporated by reference in its entirety.

BACKGROUND OF THE INVENTION

Field of the Invention

The present invention relates to a fender configuration for a motor vehicle, with a fender and a deformation element, which is C-shaped in cross section. For the substantially vertically oriented supporting of an upper edge of the fender, an upper limb of the deformation element is connected to the fender and a lower limb is connected to the vehicle body. The invention also relates to a motor vehicle equipped with a fender configuration of this type.

In the event of a collision with a pedestrian, the latter is generally caught hold of in the first phase by the motor vehicle bumper and, in a subsequent, second phase, is hurled onto the front hood of the motor vehicle, with the head or the upper body then being first to impact thereon. In this case, impact against the relatively soft, broad-surfaced front hood is less critical. On the contrary, the greatest risks for the risk of injury result from the comparatively rigid side edges of the front hood and in particular from the fender upper edge in the region of the separating gap from the front hood. The fender upper edge, specifically, has a particularly high degree of rigidity, since the fender is bent over inward here in order to be supported by a fastening section against the vehicle body. In order to be able to meet the ever more exacting requirements with regard to protection of individuals, it is endeavored to reduce the structural rigidity of the upper edge.

European patent EP 1 129 928 B1 discloses a fender configuration of the type in question which is intended to reduce the consequences of an accident on an individual, in particular by a deformation element which is C-shaped in cross section and which supports the upper border of the fender in relation to a vehicle body.

SUMMARY OF THE INVENTION

It is accordingly an object of the invention to provide a fender configuration that overcomes the above-mentioned disadvantages of the prior art devices of this general type, which embodiment, in the event of an impact of an individual on a motor vehicle, is intended to reduce the risk of injury or the severity of the injuries of the individual involved.

With the foregoing and other objects in view there is provided, in accordance with the invention, a fender configuration for a motor vehicle. The fender configuration contains a fender having an upper edge, and a deformation element being C-shaped in cross section for a substantially vertically oriented supporting of the upper edge of the fender. The deformation element has an upper limb connected to the fender and a lower limb connected to a vehicle body. The C-shaped deformation element is disposed such that the deformation element is open toward the fender.

The invention is based on the general idea of arranging a deformation element, which is C-shaped in cross section, between an upper edge of a fender and a vehicle body in such a manner that the deformation element is open toward the associated fender. In this case, the deformation element serves for the substantially vertically directed supporting of the upper edge of the fender, with an upper limb of the deformation element being connected to the upper edge of the fender and a lower limb of the deformation element being connected to the vehicle body. The C-shaped deformation element may be, for example, already preassembled on the vehicle body, thus enabling the manufacturing costs to be reduced. By the deformation element being arranged such that it is open toward the respectively associated fender, the deformation properties of the deformation element can be significantly improved, since the flexibility is improved even in the event of an impact taking place not directly from the frontal direction, but from the lateral direction. At the same time, the configuration according to the invention of the deformation element makes it possible for the deformation properties thereof to be used not only by the fender which is connected directly thereto, but also by an adjacent engine hood. For this purpose, the deformation element can be arranged in such a manner that, in the event of an impact, the engine hood is also supported on the upper limb of the deformation element. The configuration of the C-shaped deformation element such that it is open toward the respectively associated fender can reduce a risk of injury during an impact of an individual even from different directions.

In an advantageous development of the solution according to the invention, a flange region of the fender, which flange region is connected to the upper limb of the deformation element, has a flange section which is deformable and is configured as a step, in particular a flange section of S-shaped configuration. A flange section of step-shaped or S-shaped design in such a manner therefore provides a structure which can be folded in a defined manner in the case of impact and the folding behavior of which can be exactly determined beforehand by the structural shape selected. For example, in the case of a flange section configured as a step, an underlap of the step can be formed obliquely with respect to the vertical, for example at a deviation of approximately 10°, as a result of which the flange section in interaction with the C-shaped deformation element can be significantly more easily deformed than with an underlap of the step that extends parallel to the vertical direction.

In a further advantageous embodiment of the solution according to the invention, the lower limb of the deformation element has a chamfer which permits an adjustment of the deformation element in the vertical direction with respect to the vehicle body. In order in particular to be able to set the gap sizes between the fender and the engine hood in as exacting manner as possible, a likewise exact possibility of adjusting the C-shaped deformation element, on which an upper edge of the fender rests, is imperative. By the chamfer which extends substantially vertically downward and which has recesses which are in the manner of elongated holes and through which the corresponding fastening screws can be guided, an exact alignment of the C-shaped deformation element with respect to the vehicle body, in particular with respect to a fender bank, is possible. By this adjustment possibility, the engine hood and the fender can also be exactly aligned, which is of particular significance for an external, esthetic appearance of the motor vehicle. Of course, the deformation element could also be fastened via its chamfer to the vehicle body by a welded joint.

In a further advantageous embodiment of the solution according to the invention, the deformation element is configured as part of the fender bank. In this case, it is conceivable for the deformation element to form an integral part of the fender bank or to be able to be at least preassembled together with the latter. The design of the deformation element as a part, in particular as an integral part of the fender bank, affords the advantage of being able to reduce the in any case high diversity of parts and, as a result, to save on storage and logistical costs.

Preferred exemplary embodiments of the invention are illustrated in the drawings and are explained in more detail in the description below, with identical reference numbers referring to identical or similar or functionally identical components.

Other features which are considered as characteristic for the invention are set forth in the appended claims.

Although the invention is illustrated and described herein as embodied in a fender configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
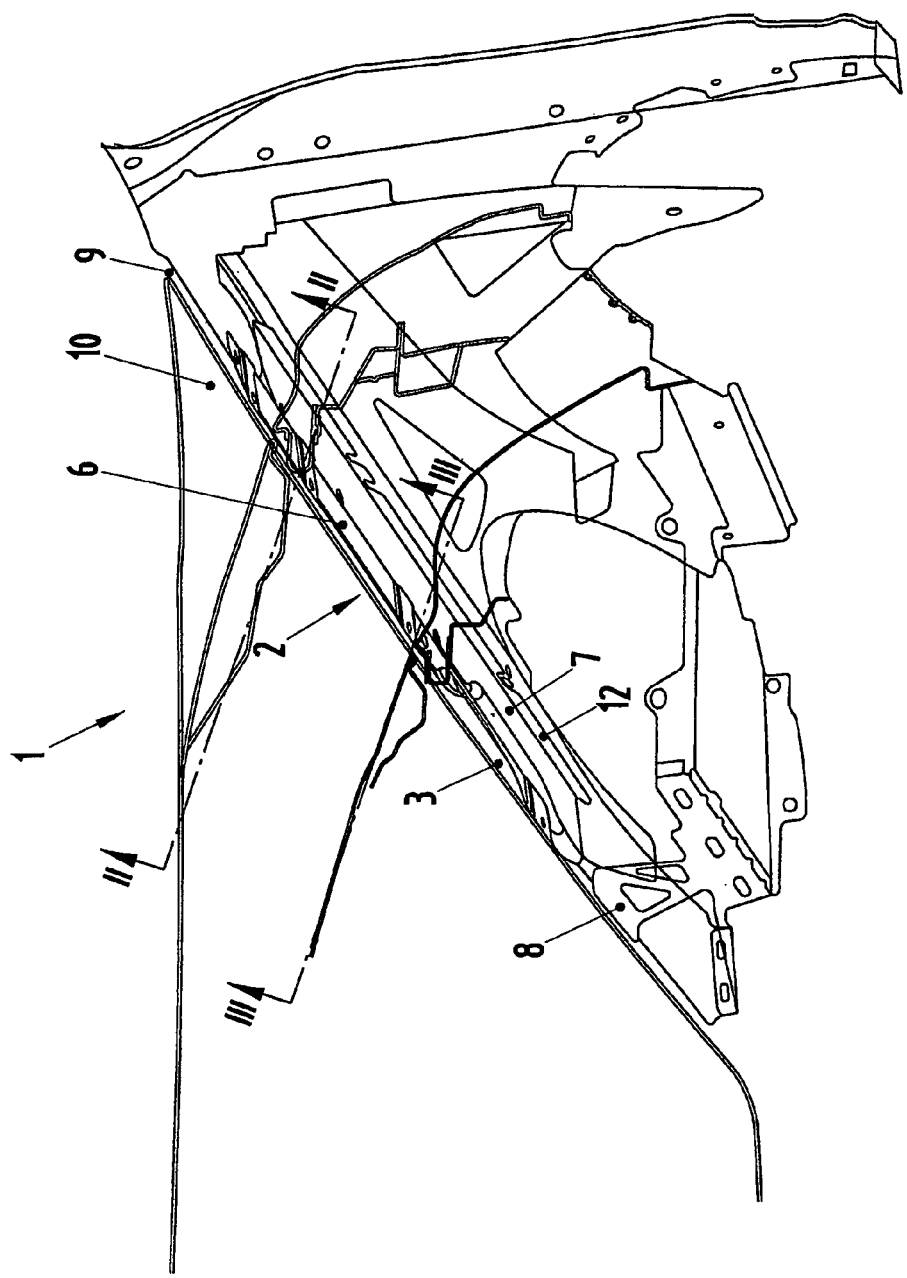
FIG. 1 is a diagrammatic, perspective view of a fender configuration in a region of a front, left fender according to the invention.
Figure 2:
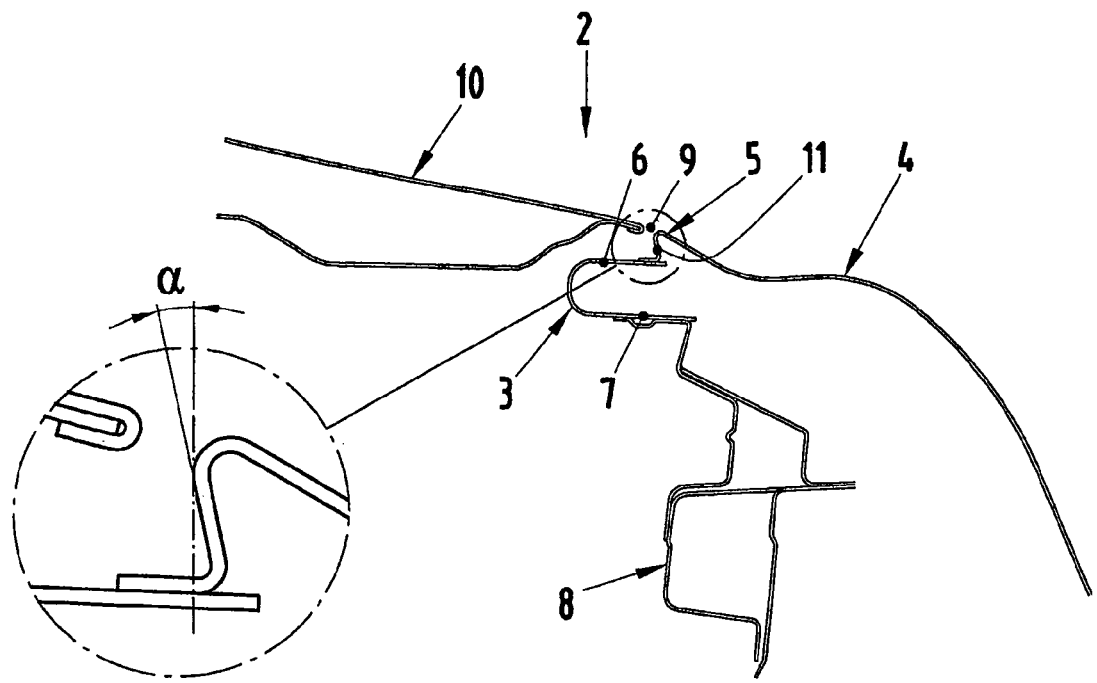
FIG. 2 is a diagrammatic, sectional view through the fender configuration taken along the sectional plane II-II shown in FIG. 1.
Figure 3:
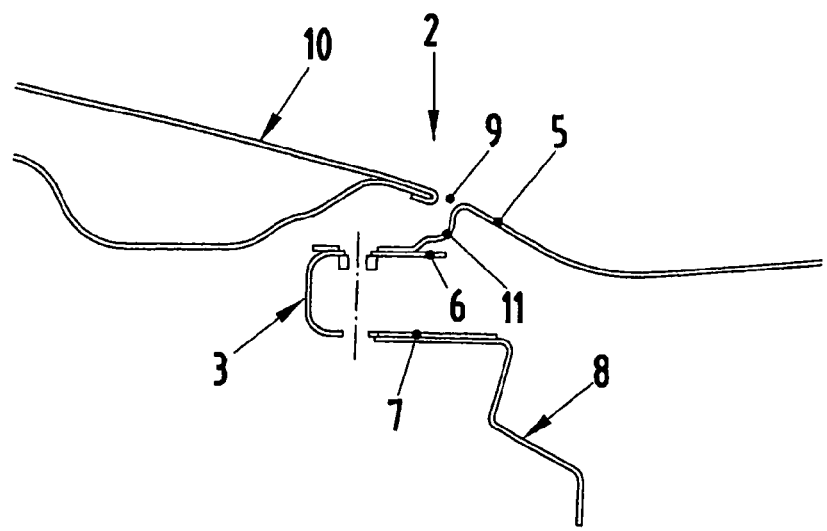
FIG. 3 is a diagrammatic, sectional view through the fender configuration taken along the sectional plane III-III shown in FIG. 1.
Figure 4:
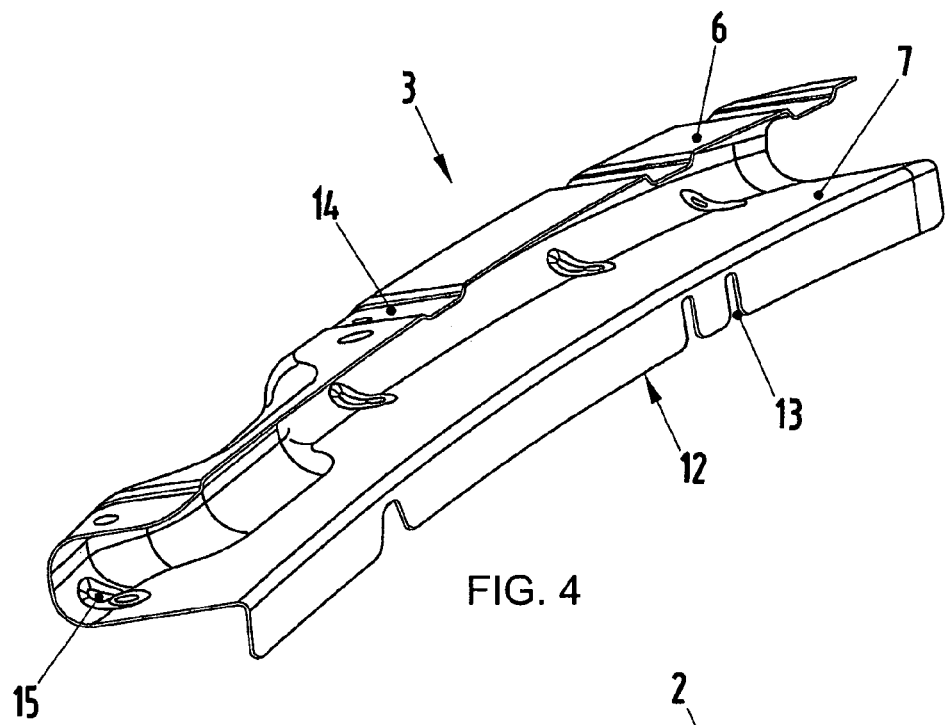
FIG. 4 is a diagrammatic, perspective view of a C-shaped deformation element according to the invention.
Figure 5:
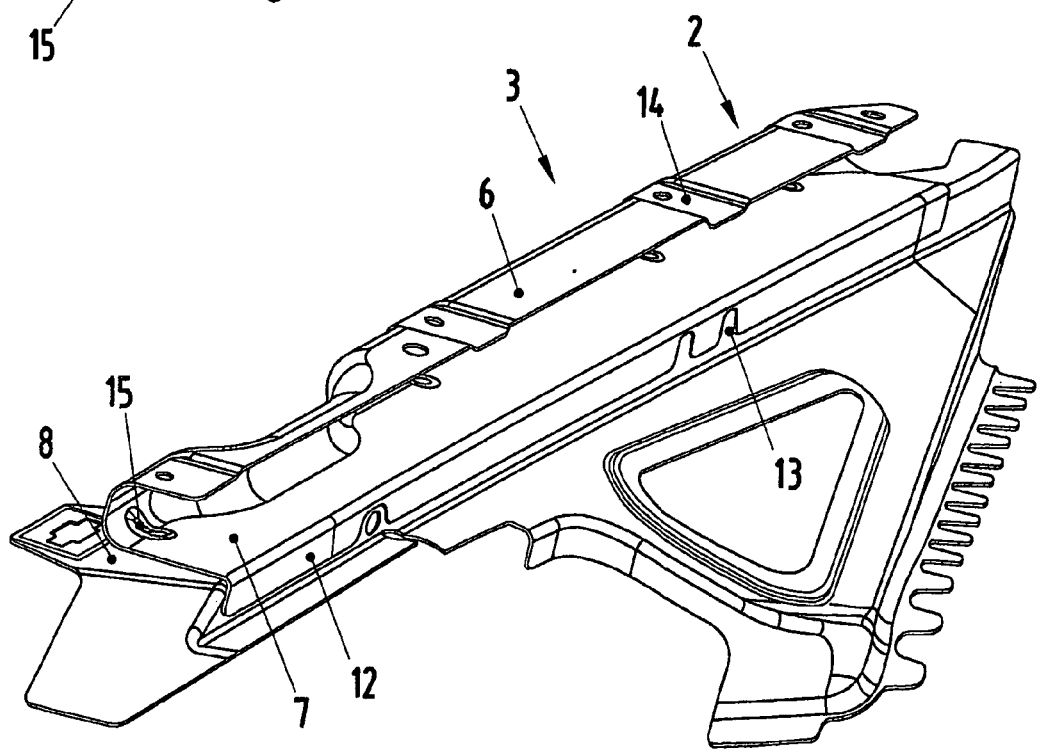
FIG. 5 is a diagrammatic, perspective view of the deformation element when arranged on the vehicle body.

Referring now to the figures of the drawing in detail and first, particularly, to FIG. 1 thereof, there is shown a motor vehicle 1 having a fender configuration 2 according to the invention with a fender 4, only shown by way of contour along the lines II and III, and a deformation element 3 which is C-shaped in cross section (see FIGS. 2 and 3 too). The deformation element 3 serves here for the substantially vertically directed supporting of an upper edge 5 of the fender 4, with an upper limb 6 of the deformation element 3 being connected to the fender 4 and a lower limb 7 of the deformation element 3 being connected to a vehicle body 8. In this case, the deformation element 3 runs substantially parallel to a gap 9 which separates a lateral border of an engine hood 10 from the upper edge 5 of the fender 4. According to the invention, the C-shaped deformation element 3 is now arranged such that it is open toward the associated fender 4.

The deformation element 3 makes it possible, by its resiliently configured limbs 6 and 7, to absorb a considerable amount of impact energy by deformation and, as a result, to limit or to minimize the injury consequences for an individual involved in an accident with the motor vehicle 1. The upper edge 5 of the fender 4, which upper edge can also be referred to as the "flange region", is connected to the upper limb 6 of the deformation element 3 and has a cross section which is deformable and is configured as a step, in particular an S-shaped cross section (see FIG. 2). In this case, the upper edge 5 of the fender 4, which upper edge is configured as a step, has an underlap 11 which preferably deviates by approximately 10° from the vertical and, as a result, upon an impact of a pedestrian with the fender 4 or the engine hood 10, can be more easily deformed than a vertical underlap 11. The deviation according to the detailed illustration in FIG. 2 is referred to by the angle α.

According to FIGS. 2 and 3, the lower limb 7 of the deformation element 3 is connected to the vehicle body 8, with it being possible for the latter to be configured, for example, as a "fender bank". For better alignment of the deformation element 3 with respect to the vehicle body 8, the lower limb 7 of the deformation element 3 has a chamfer 12 on which, for example, at least one elongated hole 13 is provided. The deformation element 3 can be aligned with respect to its vertical position on the vehicle body 8 and fixed via the at least one elongated hole 13. This is of particular significance in particular for an external appearance of the gap 9, since, in the region of the gap 9, the side edge of the engine hood 10 and the upper edge 5 of the fender 4 should be aligned with each other in order to produce an attractive, esthetic overall impression.

Depending on the desired deformation properties, the deformation element 3 may be formed, for example, from plastic or from metal, in particular as a "sheet-metal punched part". Of course, it is also conceivable for the deformation element 3 to be part of the vehicle body 8, i.e. or of the fender bank.

By inserting or molding-in beads 14 and stiffening elements 15, the rigidity and therefore the deformation behavior of the deformation element 3 can be defined individually.

The configuration according to the invention of the deformation element 3 and the configuration according to the invention of the flange region, i.e. of the upper edge 5 of the fender 4, make it possible to reduce a "head-insurance-criteria value (HIC value)" significantly below the legal requirements. In addition, an inclination of the underlap 11 makes it possible to significantly reduce the initial acceleration of a head impact test body, as a result of which a significantly reduced risk of injury in accidents with pedestrians can likewise be obtained.

In general, it is also conceivable for the C-shaped deformation element 3 to be able to be preassembled on the vehicle body 8 in a premanufacturing step, such that the installation step is shifted to the preassembly operation and, as a result, the actual installation process can be streamlined.

The invention claimed is:

1. A fender configuration for a motor vehicle, the fender configuration comprising:
    a fender having an upper edge; and
    a deformation element being C-shaped in cross section for a substantially vertically oriented supporting of said upper edge of said fender, said C-shaped cross section including an upper limb of the C-shaped cross section and a lower limb of the C-shaped cross section disposed opposite said upper limb, said upper limb being separated from said lower limb at one end by a gap, said deformation element having only said upper limb connected to said fender and said lower limb being connected to a vehicle body, said C-shaped deformation element disposed such that said gap is open toward said fender.

2. The fender configuration according to claim 1, wherein said fender has a flange region connected to said upper limb of said deformation element, and a cross section which is deformable and configured as a step.

3. The fender configuration according to claim 2, wherein said flange region configured as said step has an underlap deviating from the vertical.

4. The fender configuration according to claim 3, wherein said underlap deviates from the vertical by an angle approximately equal to 10 degrees.

5. The fender configuration according to claim 2, wherein said cross section is an S-shaped cross section.

6. The fender configuration according to claim 1, wherein said lower limb of said deformation element is connected to the vehicle body.

7. The fender configuration according to claim 6, wherein said deformation element is part of said vehicle body.

8. The fender configuration according to claim 1, wherein said lower limb of said deformation element has a chamfer which permits an adjustment of said deformation element in a vertical direction.

9. The fender configuration according to claim 1, wherein said deformation element is formed one of from plastic and as a sheet-metal punched part.

10. The fender configuration according to claim 1, wherein said deformation element which is C-shaped in cross section has a material thickness of approximately 70 mm.

11. The fender configuration according to claim 1, wherein said deformation element has an upright C-shape in cross section and said upper limb and said lower limb generally run horizontally.

12. A motor vehicle, comprising:
a vehicle body; and
a fender configuration containing a fender having an upper edge and a deformation element being C-shaped in cross section for a substantially vertically oriented supporting of said upper edge of said fender, said C-shaped cross section including an upper limb of the C-shaped cross section and a lower limb of the C-shaped cross section disposed opposite said upper limb, said upper limb being separated from said lower limb at one end by a gap, said deformation element having only said upper limb connected to said fender and said lower limb being connected to said vehicle body, said C-shaped deformation element disposed such that said gap is open toward said fender, said deformation element being a component separate from said fender.

13. A fender configuration for a motor vehicle, the fender configuration comprising:
a fender having an upper edge;
a deformation element being C-shaped in cross section for a substantially vertically oriented supporting of said upper edge of said fender, said C-shaped cross section including an upper limb of the C-shaped cross section and a lower limb of the C-shaped cross section disposed opposite said upper limb, said upper limb being separated from said lower limb at one end by a gap, said deformation element having only said upper limb connected to said fender and said lower limb being connected to a vehicle body, said C-shaped deformation element disposed such that said gap is open toward said fender; and
said fender further having a flange region connected to said upper limb of said deformation element, said flange region having a cross section which is deformable and configured as a step, said flange region configured as said step has an underlap deviating from the vertical.

* * * * *